United States Patent [19]

Hibbert et al.

[11] Patent Number: 4,675,782
[45] Date of Patent: Jun. 23, 1987

[54] MOLDED PLASTIC ENCLOSURE FOR DISCONNECT SWITCHES

[75] Inventors: David A. Hibbert, Tolland; Larry J. Newmark; James I. Smith, both of Avon, all of Conn.; Timothy C. Brasel; Peter C.F. Wung, both of Pittsfield, Mass.

[73] Assignee: General Electric Company, New York, N.Y.

[21] Appl. No.: 811,716

[22] Filed: Dec. 20, 1985

[51] Int. Cl.⁴ .......................................... H02B 1/04
[52] U.S. Cl. .................................... 361/356; 361/331
[58] Field of Search .................... 174/58–60; 220/3.8, 3.9, 4 B, 4 E, 242; 361/335, 331, 353, 355–357, 359, 361, 363, 376

[56] References Cited

U.S. PATENT DOCUMENTS 3,566,194  2/1971  Grytcho .......................... 361/363
3,618,804 11/1971  Krause ............................ 220/242
3,801,875  4/1974  Morby et al. .................. 361/363

FOREIGN PATENT DOCUMENTS 0988864  4/1965  United Kingdom ............... 361/357

Primary Examiner—A. D. Pellinen
Assistant Examiner—Gregory D. Thompson
Attorney, Agent, or Firm—Richard A. Menelly; Walter C. Bernkopf; Fred Jacob

[57] ABSTRACT

A three-piece molded plastic enclosure for disconnect switches consisting of a base, cover, and door individually fabricated by means of an injection molding process. The base has integrally molded extension tabs cooperating with an integrally molded hasp on the door for allowing the enclosure to be padlocked. A two-part hinge wherein part of the hinge is integrally formed with the cover and the remaining part is integrally formed with the door allowing the door to be assembled to the cover in a hinge-like fashion. Electrical components are attached to the interior of the base and the base is secured to the cover by means of a screw. The screw is only accessible from behind the door when the compartment is unlocked. Besides providing a disconnect switch that is tamper-proof behind a locked door, the molded plastic enclosure is water-tight and environmentally secure.

14 Claims, 7 Drawing Figures

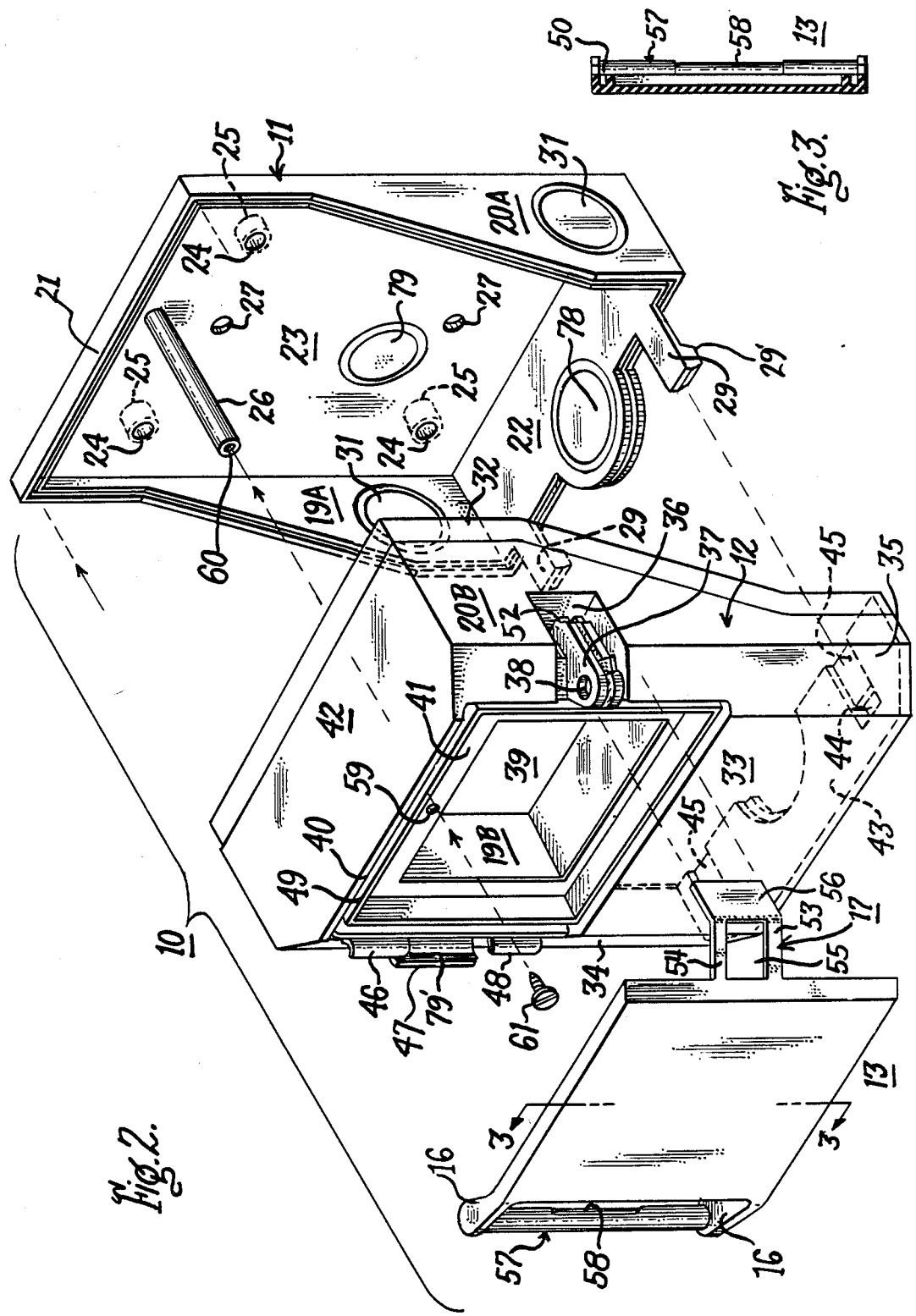

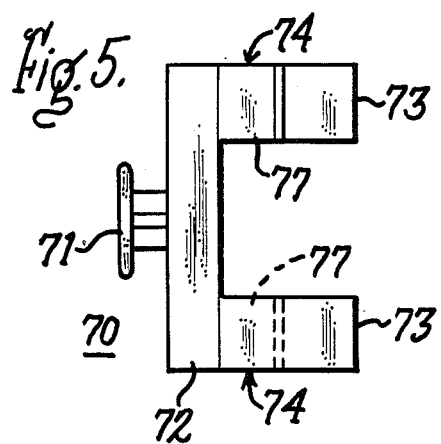
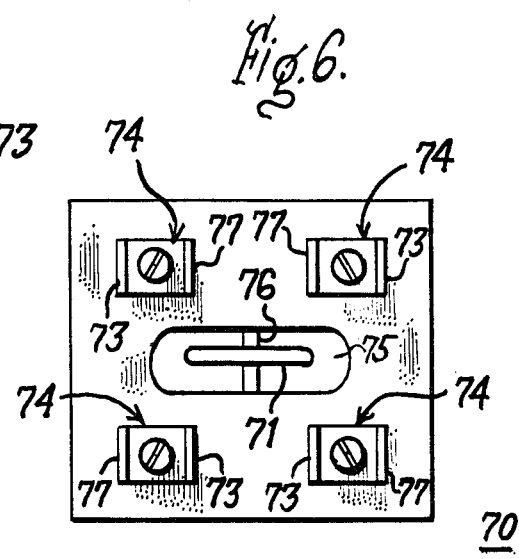
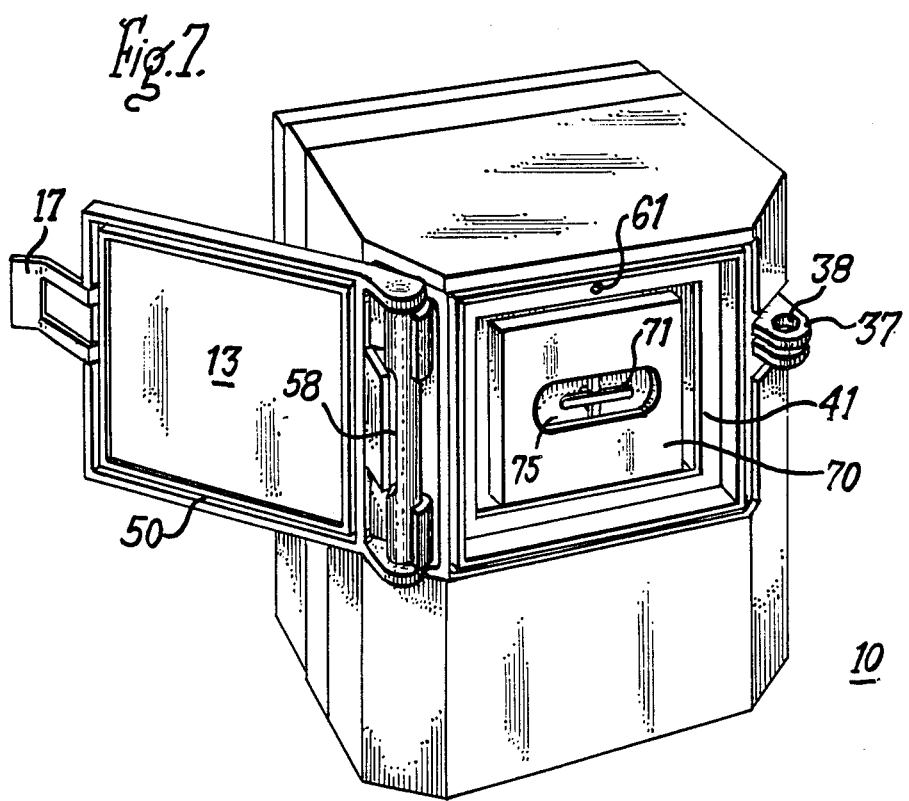

MOLDED PLASTIC ENCLOSURE FOR DISCONNECT SWITCHES

BACKGROUND OF THE INVENTION

A two-piece nonmetallic load center enclosure is described within U.S. Pat. No. 3,801,875 in the name of John A. Morby et al and is incorporated herein for reference purposes. The two-piece enclosure allows the electrical equipment to be readily accessed by disconnecting the base from the cover by means of externally accessible screws. Since the nonmetallic load center is not intended primarily for external use, adaptations to the cover and base are required to make the load center enclosure water-tight.

When such a load center is to be installed externally such as at a marina or within a trailer park, some additional closure means are required to prevent tampering with the interior electrical components. When such a nonmetallic enclosure is used to contain an air conditioning disconnect switch, such additional locking enclosure is required by local and national wiring regulations.

The purpose of this invention is to provide a nonmetallic enclosure within which both load center and disconnect switch components can be contained and within which such components are tamper-free as well as protected from rain and hazardous environments.

SUMMARY OF THE INVENTION

A three-piece molded plastic enclosure for load center and disconnect switch components wherein means are integrally formed within each of the three separate molded parts for rendering the enclosure tamper-proof, water-proof and environmetally secure. Integrally formed tabs and a hasp prevent access to the interior of the enclosure and to the screw holding the enclosure cover to the base which is situated behind a closed and locked door.

BRIEF DESCRIPTION OF THE DRAWINGS

FIG. 2 is a top perspective view in isometric projection of the three component parts which comprise the molded plastic enclosure depicted in FIG. 1;

FIG. 3 is a cross-sectional view through the plane 3—3 of the enclosure door depicted in FIG. 2;

FIG. 5 is a side view of a disconnect handle used with the disconnect base depicted in FIG. 4;

FIG. 6 is a bottom view of the disconnect handle shown in FIG. 5; and

FIG. 7 is a top prespective view of the molded plastic enclosure depicted in FIG. 1 with the door opened for access to the disconnect handle knob.

DESCRIPTION OF THE PREFERRED EMBODIMENT

Figure 1:
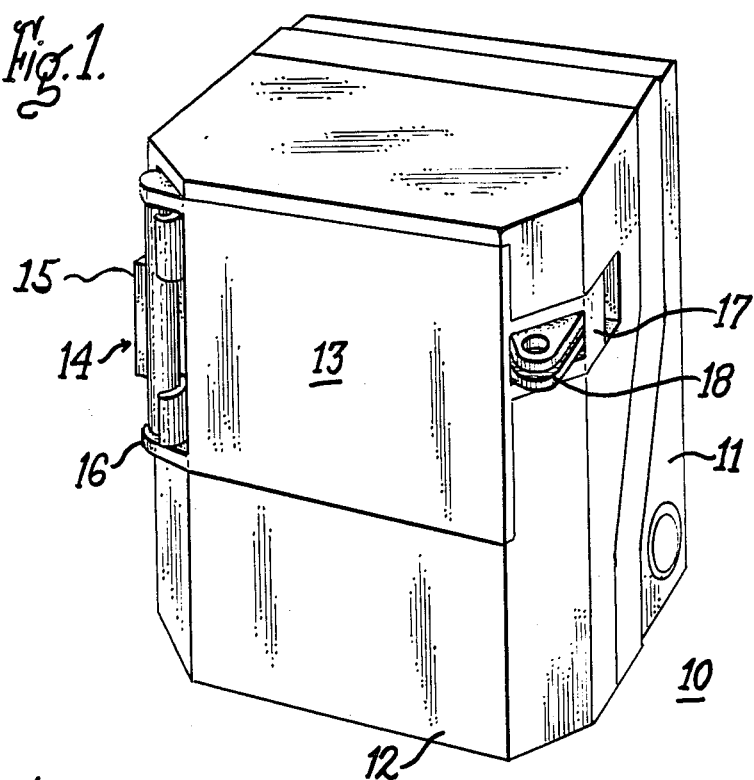
FIG. 1 is a top perspective view of the molded plastic enclosure according to the invention.

A molded plastic enclosure 10 is shown in FIG. 1 to comprise a molded plastic base 11 to which a molded plastic cover 12 is attached. An operable door 13 is attached to the cover by means of an integral hinge assembly 14 consisting of a cover hinge part 15 and a door hinge parts or arms 16 as shown. A locking hasp 17 formed within the door fits over a pair of tabs 18 formed within the cover to allow padlock facility to the enclosure.

The door 13, cover 12 and base 11, all formed from a phenylene-oxide plastic sold by General Electric under the trademark "NORYL", are shown prior to assembly in FIG. 2. The base is formed with two upstanding Z-shaped side walls 19A, 20A and a top end wall 21 which is substantially lower, that is, extend a shorter distance, than an opposite bottom end wall 22 for providing ease in wiring access to the internal components. A bottom 23 of the base is secured to the site of electrical installation by means of a pair of through holes 27 through which screws are applied. To allow for mounting of the electrical components to the bottom of the base, a plurality of recesses 24 are formed in the bottom and terminate in a closed bottom 25 as indicated for electrical insulation and environmental purposes. An upstanding post 26 integrally formed within the base extends up from the bottom and contains a threaded opening 60 on its top surface. A knockout 31 is formed within each of the side walls 19A, 20A to provide electrical access to within the enclosure along with a knockout 78 integrally formed within a bottom end wall 22 and one knockout 79 formed within the bottom 23. Also integrally formed within the end wall and extending therefrom, are a pair of tabs 29 from which a pair of detents 29' extend for insertion through a corresponding pair of slots 44 formed within a bottom end wall 43 of the cover 12. Also formed within the bottom end wall of the cover are a pair of grooves 45 to allow for clearance of the tabs. A pair of Z-shaped side walls 19B, 20B of mirror image or opposite dimension from the base side walls 19A, 20A are formed in the cover 12 and extend downward from the planar surface 33. A top end wall 42 also formed in the cover extends from the planar surface 33. A pair of angled surfaces 34, 35 also formed in the cover extend outboard of the planar surface 33. The angled surface 35 serves to support a pair of tabs 37 which form the staple for a padlock while the angled surface 34 serves to support three arcuate projections 46–48 which support a hinge pin 57 formed in the door 13. An access opening 39 is defined within the cover and is surrounded by a perimetrical flange 41 along the interior and perimetrical channel 40 along the exterior of the opening. Also formed around the exterior of the opening is an upstanding rim 49 which cooperates with the interior surface of the door 13 to provide a watertight and environment-proof connection between the door and the cover. A through hole 59 on the flange 41 allows for the connection between the cover and the base by the insertion of a screw 61 in opening 60 within the top of the upstanding post 26. The door is attached to the cover by snap-fitting a flattened surface 58 formed on the cyclindrical hinge pin 57 on the cover into cylindrical opening 79' defined between the arcuate projections 46–48. Once the door is hingedly attached to the cover, the hasp 17 which comprises a pair of arms 53, 54 extending from the edge of the door on the side opposite the hinge pin which are joined by means of an end piece 56 and defines a rectangular opening 55 as indicated which opening is arranged over the tabs 37. By arranging the hasp 17 over the tabs 37 and snappingly fitting an end piece 56 on the hasp over the detent 52 formed within the stopple recess 36, the door is held firmly in place. A pair of openings 38 through the ends of the tabs allow for the insertion of a padlock to prevent access to the interior of the enclosure. It is noted that the provision of through holes 27 in the bottom 23 of the base 11 for fastening the base to the site of electrical installation and by providing for the connection between the cover and the base by means of the screw 61 located behind the door, prevents the enclosure from being removed from the site and further prevents the cover from being removed from the base. An upstanding rim 49 tightly fits within the channel 50 formed within the inner surface of the door as shown in FIG. 3 provides an environmentally tight joint between the door and the cover.

Figure 4:
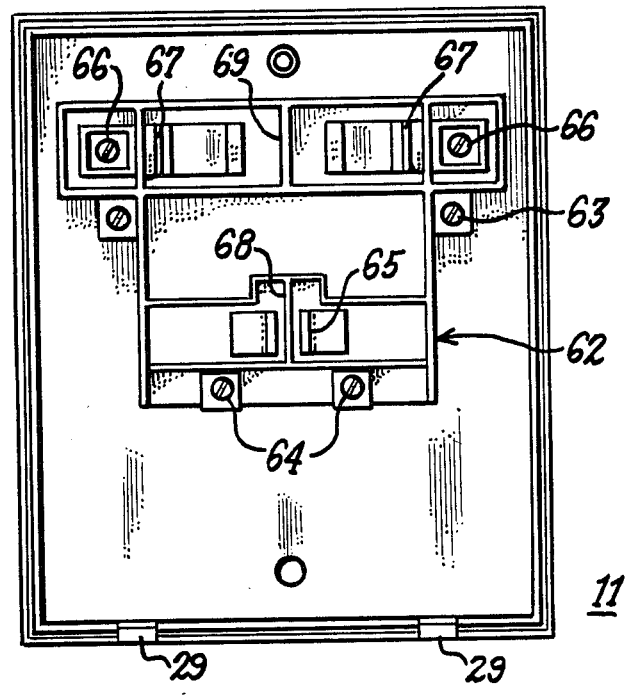
FIG. 4 is a plan view of the base within the enclosure of FIG. 1 with a disconnect switch base attached.

The base 11 is shown in FIG. 4 to support a disconnect switch base 62 which is attached thereto by means of screws 63 which threadingly engage the recesses 24 depicted earlier with reference to FIG. 2. The disconnect switch base contains a pair of line terminal lugs 64 and a pair of load terminal lugs 66. The line terminal lugs are electrically corrected with corresponding line stabs 65 separated by means of a plastic insulating barrier 68 and the load terminal lugs are electrically corrected with a corresponding pair of load stabs 67 separated by means of a plastic insulating barrier 69. Electrical connection between the line and load stabs is made by means of a disconnect handle 70 shown in FIG. 5. The handle includes a plastic plate 72 having a handle knob 71 extending from one side and corresponding pairs of clips 74 extending from the opposite side thereof. The clips 74 comprise long extending clip arms 73 for connection with the stabs 65, 67 shown earlier in FIG. 4, and short extending clip arms 77. A pair of fuses, (not shown) is connected across the clips to electrically interconnect between the clips.

The clips 74 are shown in FIG. 6 on the disconnect connect handle 70 spaced around the perimeter of an opening 75 defined through the disconnect handle which opening is provided for ease in access to the handle knob 71, as best seen in FIG. 7. The handle knob 71 is supported upon the disconnect handle by means of a crosspiece 76.

The completely assembled enclosure 10 containing the disconnect switch assembly is shown in FIG. 7 with the door 13 in the open position for providing access to the disconnect handle 70 and the handle knob 71. Access is also available to the screw 61 which was described earlier as the connecting means between the enclosure cover and the base. The perimetrical flange 41 prevents access to the electrical components mounted within the base when the door is open. A channel 50 around the perimeter of the interior of the cover is accessible for the insertion of a thin pliable polymeric gasket should the enclosure be installed in a hazardous environment such as corrosive industrial atmospheres and oceanside marinas.

Although the three-piece molded plastic enclosure is described for use with disconnect switches, this is by way of example only. The enclosure of invention finds application whenever electrical components are to be installed in a hazardous environment or in a location wherein the public has access to the enclosure.

What we claim as new and desire to secure by Letters Patent is as follows:

1. A molded plastic enclosure for electric switches comprising:
    a plastic base comprising a bottom surface encompassed by a pair of opposing side walls and a pair of opposing end walls, said side walls and end walls defining a bottom perimeter around said bottom surface, one of said base end walls including means defining at lest one attachment tab extending therefrom;
    a plastic cover comprising a planar surface having access means formed therein and a pair of integral depending opposing side walls and a pair of integral depending opposing end walls defining a top perimeter around said planar surface, one of said cover end walls including means defining at least one attachment slot formed therein; and
    a plastic door comprising a four-sided plate having a hinge pin one one of said sides and a hasp integrally formed on an opposing other one of said sides, said plate having a perimetric groove integrally formed around the four sides of said plate for receiving a perimetric rim integrally formed around said access means when said cover is attached to said base and said door is attached to said cover.

2. The molded plastic enclosure for electric switches of claim 1 further including at least one arcuate projection integrally formed on said cover for receiving said hinge pin on said door and at least one apertured tab integrally formed on an opposing side of said cover for receiving said hasp on said door when said door is rotated to a closed position on said cover.

3. The molded plastic enclosure for electric switches of claim 2 including a recess integrally formed on said cover said apertured tab for snapping receiving an edge of said hasp when said door is in said closed position.

4. The molded plastic enclosure for electric switches of claim 1 including a perimetric flange extending around said access means and a screw hole on said flange for alignment with an upstanding post integrally formed on said bottom surface, said upstanding post having a screw opening integrally formed on a top surface for threadingly receiving a screw for fastening said cover to said base.

5. The molded plastic enclosure for electric switches of claim 1 wherein said attachment tab further includes a detent integrally formed at one end for engaging one side of said attachment slot to prevent said cover from being removed from said base.

6. The molded plastic enclosure for electric switches of claim 1 further including at least one through hole integrally formed within said bottom surface for attaching said base to an electrical installation site.

7. The molded plastic enclosure for electric switches of claim 1 wherein said base side walls comprise a Z-shaped configuration and said cover side walls comprise a Z-shaped configuration whereby said base and said cover side walls define a rectangular configuration when said cover is attached to said base.

8. The molded plastic enclosure for electric switches of claim 1 wherein said hinge pin extends between a pair of arms integrally formed and projecting from said door.

9. The molded plastic enclosure for electric switches of claim 2 including two further arcuate projections integrally formed on said cover opposedly facing said one arcuate projection to receive said hinge pin.

10. The molded plastic enclosure for electric switches of claim 9 wherein said hinge pin comprises a cylindrical configuration for being engaged by said arcuate projections.

11. The molded plastic enclosure for electric switches of claim 10 wherein said hinge pin includes a flattened surface along said cylindrical configuration for ease in inserting said hinge pin within said arcuate projections.

12. The molded plastic enclosure for electric switches of claim 1 further including at least one circular knockout means defined within said base side walls for electrical access to said base.

13. The molded plastic enclosure for electric switches of claim 1 further including at least one circular knockout means defined within one of said base end walls for electrical access to said base.

14. The molded plastic enclosure for electric switches of claim 1 including an electrical disconnect switch base attached to said base.

* * * * *